W. E. TILLINGHAST.
VACUUM AND RETURN STEAM TRAP.
APPLICATION FILED OCT. 24, 1916.
1,339,074. Patented May 4, 1920.
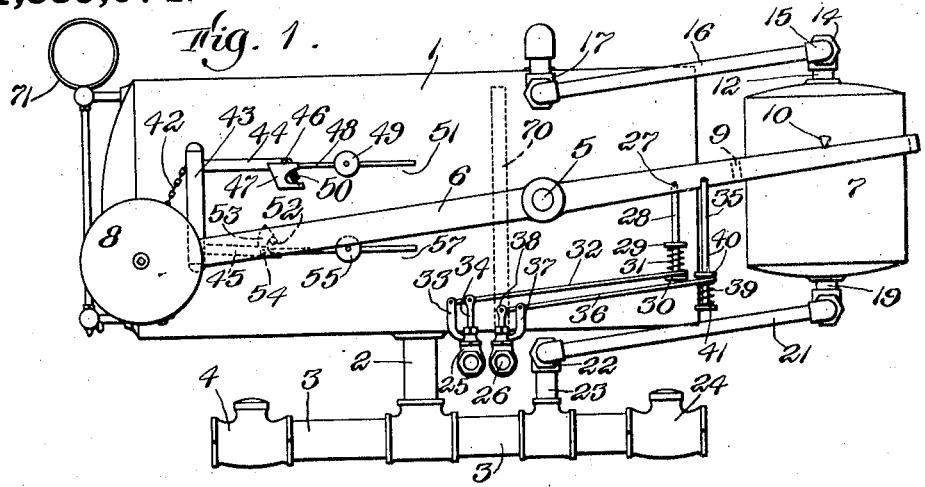
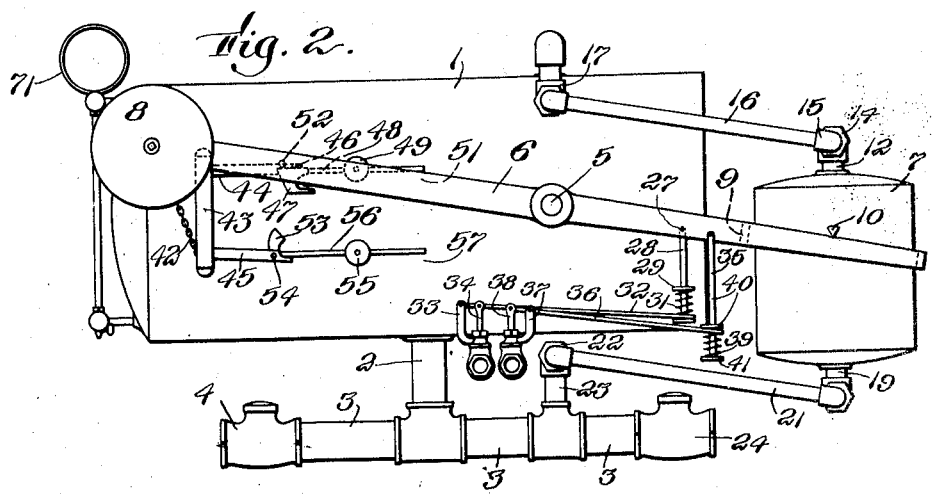
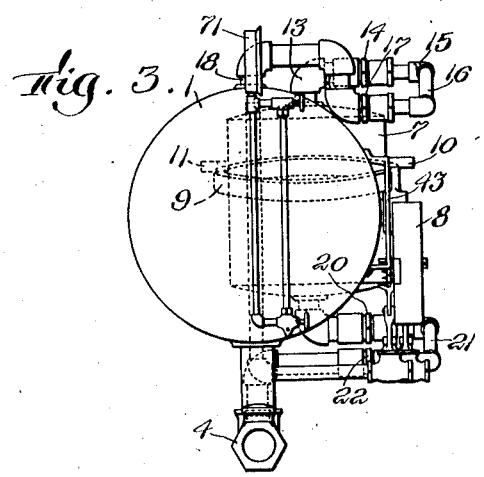
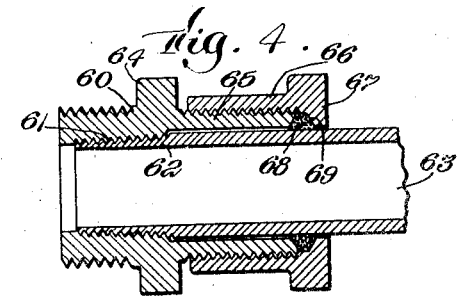
Inventor:
Wallace E. Tillinghast,
by Geo. H. Maxwell,
Attorney.

UNITED STATES PATENT OFFICE.

WALLACE E. TILLINGHAST, OF AUBURN, RHODE ISLAND.

VACUUM AND RETURN STEAM-TRAP.

1,339,074. Specification of Letters Patent. Patented May 4, 1920.

Application filed October 24, 1916. Serial No. 127,488.

*To all whom it may concern:*

Be it known that I, WALLACE E. TILLINGHAST, a citizen of the United States, and resident of Auburn, in the county of Providence and State of Rhode Island, have invented an Improvement in Vacuum and Return Steam-Traps, of which the following description, in connection with the accompanying drawings, is a specification, like letters on the drawings representing like parts.

My present invention is an improved return trap for the return of condensation from heating systems where a vacuum is carried.

Important objects of the invention are to provide a return trap which will be an efficient motor ram, collecting the condensation in the heating system, and then, under predetermined conditions, effectively discharge the condensed water into the boiler of the system against high pressures and substantially irrespective of the water temperatures. A further object is to enable the condensed water collected in the trap to be held and retained therein until a predetermined quantity is collected and then to be automatically discharged by the use of a minimum amount of steam, which steam is immediately shut off when the water is completely discharged and the apparatus returned to normal or filling position. It has been customary in prior vacuum steam traps, to utilize float valves or the like which were expensive to build and difficult to maintain in proper condition, and a further object of my present invention is to eliminate such prior complex devices and to provide an extremely simple, economical and efficiently acting trap. To this end I have arranged the body of the trap or receiver as stationary and arranged the moving parts on the exterior, where they are easily accessible, providing a ball bearing for the main operating mechanism, with renewable disk valves to be opened and closed, and automatic locking devices which can be adjusted or set for operation at predetermined times as desired. The condensed water collecting in the trap flows into a vertically movable cylinder, which is arranged to overbalance a counterweight and locking device when a specified weight has been collected therein. The vertical moving of the cylinder effecting the opening of a steam valve to force out the condensed water, and when forced out the return movement shutting off the steam and leaving the trap in filling position.

Further details of construction, important features and novel combinations of parts will be hereinafter more fully pointed out and claimed.

Referring to the drawings illustrating a preferred embodiment of my return trap, Figure 1 is a side view of the apparatus in normal or receiving position;

Fig. 2 is a corresponding side view with the trap in discharging position;

Fig. 3 is an end view; and

Fig. 4 is an enlarged cross sectional view of a novel form of steam joint employed.

As shown in the drawings, the apparatus consists in a receiver or tank 1, which may be suitably supported and is in communication with the steam heating system through inlet pipes 2 and 3 through a check valve 4. Mounted on the side of the receiver 1 is a stud 5 carrying a ball bearing for the lever 6, which lever extends lengthwise of the tank 1 and is adapted to carry at one end a vertically movable cylinder 7, and at its other end a counterbalance 8. The cylinder 7 is supported at the end of the lever 6 by having said lever curved around to encircle the cylinder (see Fig. 3) providing an inclosing ring 9 and affording diametrically opposite bearings for the knife edges 10 and 11 at either side of the cylinder 7. The ring-like portion 9 is spaced sufficiently from the exterior of the cylinder to permit of the vertical oscillations of said lever while the cylinder remains in the same vertical plane, to be described. This cylinder 7 is intended to be moved downwardly by the weight of condensed water collected therein, when its weight overbalances the counterbalance 8 and the lock, to be described. The cylinder 7 at its top has an outlet pipe 12 extending vertically and being connected by a pair of elbow joints 13 to a horizontal steam-tight pipe connection at 14 (see Fig. 3) to a second elbow joint 15 and a horizontal pipe 16 extending from the cylinder to the receiver 1, where it leads through a second steam pipe joint 17 into the top of the receiver at 18. These steam pipe joints at 14 and 17 are illustrated in detail in Fig. 4 and are in proper alinement with each other so that the connecting pipe 16 will be at all times parallel with the lever 6 and thus facilitate the vertical movement of the cylinder 7 as said lever rocks on the ball bearing at 5. A similar connection through the lower part of the cylinder 7 by the pipe 19, steam joint 20, horizontal pipe 21 and second steam joint at 22 into the lower pipe 3 through the branch 23, is arranged, a check valve at 24 being also provided, through which the discharge or return of condensed water is made. These pipes 16 and 21 are each parallel and the centers where they are connected to the cylinder 7 and on which they turn are in vertical alinement through the knife bearings 10 and 11, and the centers where the pipe 16 is connected to the receiver 1 and the pipe 21 to the branch 23 are also in exact vertical alinement with the ball bearing 5.

This construction insures the vertical movement of the cylinder 7 without binding or undue friction, while maintaining the cylinder in its vertical position.

Attached to the receiver 1 at the under portion is a vent check valve 25 and a steam inlet valve 26, these two valves being alternately opened and closed by the raising or lowering of the cylinder 7. To effect this movement, the lever 6 has pivoted thereto at 27 a rod 28 carrying collars 29 and 30 between which collars a coiled spring 31 is pivoted and bearing upon the extreme end of the valve lever 32 extending to a bracket 33 on the valve 25 and operating the valve stem 34. Downward movement of the cylinder 7 shuts off the valve 25 while this same movement opens the steam valve 26 by a similar arrangement, consisting in the rods 35 and 36, the latter being pivoted to a bracket 37 on the valve 26 and operating the valve stem 38. A spring 39 between collars 40 and 41 on said rod 35 is also provided. It will be noted that the downward movement raises the valve stem 38 of the steam inlet valve by reason of position of its bracket 37 carrying the fulcrum for the rod 36, while the valve stem 34 of the vent valve 25 is closed by the same downward movement. Upward movement of the cylinder 7 reverses the opening and closing action on said valves.

The counterbalance 8 on the end of the lever 6 has a chain stop 42 to limit the upward and downward oscillations of said lever. Adjacent this end of the lever 6 is a bracket 43 having an extending arm 44 at its upper portion and a similar arm 45 at its lower portion. To the outer end of the arm 44 is pivoted at 46 a latch 47, said latch having a rearwardly extending rod 48, to which a weight 49 is secured in adjusted position. A spring 50 holds said latch normally in position as shown, with the rod 48 raised on a stop 51 attached to the receiver 1. When the lever 6 is oscillated by the downward movement of the cylinder 7, a pin 52 thereon moves upwardly by the point of the latch 47 and rests on the top of said latch as clearly shown in Fig. 2. The latch will hold the lever 6 in this position until all or nearly all of the water is discharged from the cylinder 7 and the upsetting effect of the counterbalance 8 is sufficient to depress the latch 47 against the weight 49 and its spring 50, thus permitting the counterbalance 8 to move the lever 6 into the position shown in Fig. 1. When in this position the pin 52 will be engaged by the latch 53 pivoted at 54 to the arm 45 and carrying a weight 55 on its rod 56, which in normal position will rest against the stop 57. I prefer to make the pin 52 with a beveled face sufficient to coöperate with the beveled face on the latch 53 and hold the same in contact until the upsetting weight of the water in the cylinder 7 is sufficient to force the pin 52 by said latch 53 and allow the cylinder 7 to descend.

In Fig. 4 I have illustrated in enlarged detail the steam and vacuum pipe-turning joints at the pipe connections in the top and bottom of the cylinder 7 and in the top of the receiver 1 and the pipe 3 respectively. This joint, in each case, comprises the socket member 60, which is externally threaded to be fitted into the adjacent coupling, with an externally tapered thread, as shown at 61 to receive the correspondingly tapered threaded end portion 62 of the connecting pipe 63. The socket member 60 has a flange 64 and extending above said flange is a threaded portion 65 of greater interior diameter than the exterior of the pipe 63. The follower 66 is adapted to be threaded upon said portion 65 and to receive and compress between the top flange 67 of said follower and the end of the portion 65 to inclose the packing 68. If desired, I may recess the inner portion of the flange 67 as shown at 69 to receive and compress the packing 68 upon the end of the socket member as well as upon the outer circumference of the pipe 63. This construction enables the turning movement of the pipes 16 and 21 on their respective connections with the fixed members while maintaining a steam and vacuum tight joint therethrough. This particular feature is of especial importance, as it enables me to utilize a rigid threaded pipe construction of metal, whereas otherwise a flexible rubber pipe or the like might be required. Connected to the steam inlet valve 26 is a pipe 70 extending upwardly inside the receiver 1 and terminating at a point near the top of the receiver so that the steam admitted through said valve will emerge at the top of the tank, creating pressure on the water within said tank and an equivalent pressure through the top connecting pipe 16 on the water in the cylinder 7, forcing the water contained in both out of the pipes 2 and 23 and through the check valve at 24, while holding the check valve at 4 closed. As it is desirable to register the pressure within the receiver, I fit a gage 71 to the same.

In the operation of my return trap, the latches 53 and 47 are adjusted by moving the weights 55 and 49 respectively thereon, to set the upward and downward movements respectively of the lever 6 to occur at predetermined moments. The condensation flowing into the trap raises the water level therein and in the cylinder 7 until the latch 53 will no longer hold the lever 6 against the downward tendency of the weight of the accumulated water in the cylinder 7. The amount of weight necessary to thus overbalance the latch 53 can be accurately gaged by the beveled faces of the pin 52 and of the latch 53 as above explained. Thereupon the cylinder 7 having received the desired weight of water, breaks the lever from the latch 53 and moves it upon the ball bearing 5, simultaneously closing the vent valve 25 and opening the steam valve 26. The lever 6 meanwhile has raised above the latch 47 and is held in the position shown in Fig. 2, while the steam flowing into the top of the receiver 1 and through the pipe 16 into the top of the cylinder 7 forces the water therein contained outwardly and through the check valve 24. The cylinder 7 is thus held downwardly, and the valve open until all the water is forced out, or until nearly all is forced out before the latch 47 will permit the counterbalance 8 to again oscillate the lever 6 and restore the cylinder to normal position, thus closing the steam valve.

It will thus be seen that I have devised a return steam trap which is perfectly controlled, both as to the time when the steam is admitted to force the water out and as to the time when the steam is shut off after a predetermined amount of condensed water has been returned. Furthermore all internal mechanism is eliminated, moving parts, valves, etc., being arranged outside the reservoir and in full view. By having the body of the apparatus, i. e., the receiver 1, in fixed stationary position, but a comparatively slight strain is brought upon the apparatus through the relatively little weight of water in the cylinder 7, and its bearings and moving connections. The trap is locked in both receiving and discharging position and the weights and pressures for releasing each are adjustable. While I have explained the foregoing in connection with a steam pressure and forced return operation, it will be readily appreciated that I may utilize the apparatus for a gravity return, eliminating the steam valve 26 and its operation and utilizing the downward movement of the cylinder 7 to open a return valve for gravity return.

My invention is further described and defined in the form of claims as follows:

1. In an apparatus of the kind described, a receiver, a vertically movable cylinder outside said receiver, an adjustable latch constructed and arranged to hold said cylinder in its vertical position until overbalanced by a predetermined weight of water accumulating in said cylinder, in combination with a second latch to hold the cylinder in lowered position until the predetermined amount of water has been discharged from the receiver.

2. Apparatus of the kind described, comprising a receiver fixed in stationary position, a lever pivoted to a fixed anti-friction bearing on said receiver, a plurality of anti-friction bearings for a cylinder adjacent one end of said lever, said lever partially surrounding said cylinder, a counterbalance on the other end, a cylinder mounted on said plurality of anti-friction bearings, flexible pipe connections from the receiver to the cylinder and from said cylinder to a discharge pipe, a valve to admit steam into said receiver and means controlled by the vertical movement of said cylinder on its receiver to open and close said steam valve.

3. Apparatus of the kind described, comprising a fixed horizontal receiver, a lever pivoted on said receiver and extending beyond one end, bearings on the extended lever to receive, in balanced position, a cylinder adapted to rest thereon, and be maintained in vertical alinement during oscillation of said lever, a counterbalancing weight on the other end of said lever, flexible pipe connections from the top of the movable cylinder to a point on said receiver, parallel flexible pipe connections from the bottom of the cylinder to a discharge pipe, in combination with latches automatically operating on the counterbalanced end of said lever to hold the cylinder in either raised or lowered position until overbalanced, and then to allow said cylinder to move vertically to the limit permitted by the apparatus.

4. Apparatus of the kind described, comprising a fixed receiver having inlet and vent valves, a lever pivoted to said receiver intermediate its height and extending longitudinally thereof, having one end beyond the receiver and forked, a vertically movable cylinder positioned adjacent the end of said receiver and supported on said forked end of the lever, a threaded pipe connection from the top of said cylinder to the upper part of the receiver, having means permitting rotation of the threaded pipe connections while maintaining the same steam tight, a similar threaded pipe connection from the bottom of the cylinder to a discharge pipe, both pipe connections being parallel with the lever and of equal length with the lever from its pivot to the cylinder bearings, a counterbalancing weight on the other end of said lever, latches operating to control the oscillation of said lever and the corresponding vertical movement of the cylinder, in combination with means acting to yieldingly operate the inlet and vent valves of the receiver.

In testimony whereof, I have signed my name to this specification, in the presence of two subscribing witnesses.

WALLACE E. TILLINGHAST.

Witnesses:
  MINNA S. TILLINGHAST,
  CORA B. SMITH.